Jan. 8, 1924.
F. F. UEHLING
1,480,317
GAS ANALYSIS APPARATUS
Filed April 18, 1923
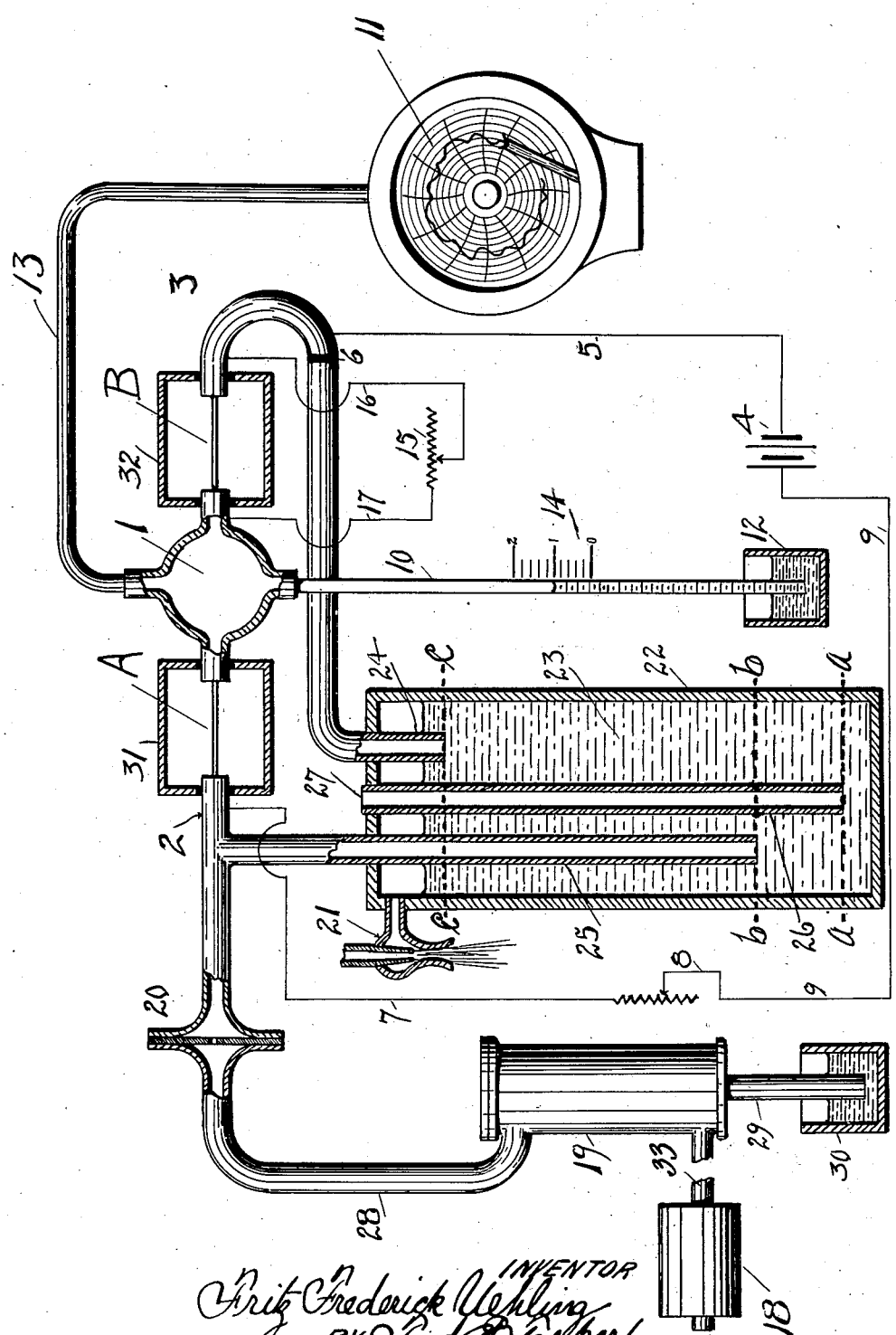

Patented Jan. 8, 1924.

1,480,317

UNITED STATES PATENT OFFICE.

FRITZ FREDERICK UEHLING, OF PASSAIC, NEW JERSEY.

GAS-ANALYSIS APPARATUS.

Application filed April 18, 1923. Serial No. 632,853.

*To all whom it may concern:*

Be it known that I, FRITZ FREDERICK UEHLING, a citizen of the United States, and resident of Passaic, in the county of Passaic and State of New Jersey, have invented certain new and useful Improvements in Gas-Analysis Apparatus, of which the following is a specification, reference being had therein to the accompanying drawing.

My present invention relates to a combustible recorder or indicator for measuring the constituents of a gas or fluid. The invention is based on the natural laws governing the flow of gas through small or restricted passages, and particularly the law that the amount of gas flowing through a restricted passage decreases as the temperature of the gas increases, and the reverse; and it comprises suitable mechanism, of a simple and inexpensive kind, for utilizing these laws and carrying them into effect for the purposes specified; and the invention may be said to consist essentially in the construction, arrangement and combination of parts, substantially as will be hereinafter described and claimed.

In the accompanying drawing I have represented a single sectional side view of my improved combustible recorder and its connections, the same being only one specimen embodiment, from many conceivable forms, and is shown more or less in a diagrammatic form.

To make use in my invention of the underlying physical laws referred to, I have a suitable chamber 1 which has a restricted inlet A and a restricted outlet B. The gas or fluid whose combustible constituent is to be measured is pressed or forced into chamber 1 through the restricted inlet A by a constant pressure in a pipe 2, and out of chamber 1 through the restricted outlet B into a pipe 3 where a constant lower pressure is maintained. The tension of the gas between the restricted members A and B will depend upon the relative resistances of said restrictions to the flow of gas.

If, for example, the resistance to the flow of gas through the restriction A is the same as the resistance through the restriction B then the tension in the space between A and B would be less than the pressure in pipe 2 by an amount equal to one-half the difference between the pressure in pipe 2 and the pressure in pipe 3. In other words if the resistance to the flow of gas is the same through inlet A as through outlet B, the pressure drop across the inlet A would be the same as the pressure drop across the outlet B and the sum of the two pressure drops would be equal to the total pressure drop between pipe 2 and pipe 3. It is evident, however, that if there is an increase in the resistance offered to the flow of gas by the restricted passage A there will be a corresponding increase in the pressure drop between pipe 2 and chamber 1, but since the pressures in pipe 2 and in pipe 3 are automatically maintained constant, as I will presently describe, the tension of the gas in chamber 1 will vary with any change in the resistance offered by the restriction A. To further illustrate that the tension of the gas between the restrictions A and B will vary with any change in the resistance offered by the restriction A I will consider the effect from another point of view. As will be explained later, the gas in pipe 2 is automatically maintained at a constant pressure while the gas in pipe 3 is automatically maintained at a lower constant pressure, therefore regardless of what the respective resistances of A and B may be, the amount of gas that enters chamber 1 through A must be the same as the amount of gas that leaves chamber 1 through B. If the restricted passages A and B have each the same resistance to the flow of gas, then in order to cause as much gas to enter chamber 1 through inlet A as passes out through outlet B, the difference in the pressure between pipe 2 and chamber 1 must be the same as the difference in pressure between chamber 1 and pipe 3, in which case, as previously stated, the pressure in chamber 1 would have to be less than the pressure in pipe 2 by an amount equal to one-half the difference between the pressure in pipe 2 and the pressure in pipe 3. However, if the resistance of the restriction A be increased there would at that instant be less gas entering chamber 1 through inlet A than passes out through outlet B. The pressure in chamber 1 would thus grow less, thereby causing less gas to be forced out through outlet B against the constant pressure in pipe 3 and more gas to be forced in by the constant pressure in pipe 2 through inlet A. Therefore with in increase in the resistance of inlet A the pressure in chamber 1 will decrease until there again comes a time when as much gas enters through inlet A as passes out through outlet B. In like manner should the resistance of inlet A decrease, the pressure within chamber 1 will increase until the flow through members A and B is again the same.

It follows therefore that the tension of the gas in chamber 1 will vary with any change in the resistance to the flow of gas through port A. In the same way any change in the resistance of the restriction B will also affect the tension of the gas between members A and B, but in the opposite direction, that is to say, as the resistance of outlet B increases, the pressure of the gas in chamber 1 increases, and as the resistance of outlet B decreases the pressure of the gas in chamber 1 decreases, the effect being opposite to that caused by any change in the resistance of inlet A. It is therefore quite evident that if there be a simultaneous and equal change in the resistance to the flow of gas through member A and the resistance to the flow of gas through member B, the effect on the pressure or tension of the gas between members A and B will be zero, the effect of the change in the resistance of restriction A neutralizing the effect of the same change in restriction B.

The form, shape, size and contour of these restrictions may be anything that will retard the flow of gas, and the material from which they are made may also vary within the widest limits. In the particular embodiment of my invention, as herein described, I prefer to utilize two capillary platinum tubes, one for the restricted inlet A and the other for the restricted outlet B. Both of these platinum tubes A and B are heated electrically, the purpose of which heating I will explain later, and more in detail. These capillary tubes are respectively protected against the outside influence of the atmosphere by the covers 31 and 32, both of which are electrically insulated from the rest of the instrument as shown.

An electric current from a battery 4 passes through conducting wire 5 to pipe 3 which is insulated from the rest of the system at 6, and from the connecting pipe 24, at the same point, which pipe runs to the regulator. From the pipe 3 the current passes through the platinum capillary tube B, through the walls of chamber 1, through platinum capillary tube A to pipe 2, and from pipe 2 through wire 7, rheostat 8 and wire 9 back to the battery, thus completing the circuit. The electrical resistance of the capillary tubes A and B causes them to heat up to a temperature the degree of which can be adjusted by the rheostat 8.

The resistance to the flow of gas as offered by any form of restriction, increases as the temperature of the restriction increases. In other words, the hotter either of the capillary tubes A and B becomes, the smaller will be the amount of gas passing through it in a unit of time. This is obvious, because the hotter the gas passing through the capillary tube, the greater will be its volume per unit weight. There is of course another effect on thte amount of gas going through tubes A and B which is due to the expansion of the tubes themselves when heat is applied to them. This effect is, however, negligibly small in comparison with that due to the expansion of the gas as it comes in contact with the hot tubes. The net result is that the resistance offered to the flow of a gas through a capillary tube, or through any other form of restriction, increases greatly with any temperature rise and varies in accordance with the temperature fluctuation of such a restriction.

In the particular form of the apparatus I am describing, the platinum capillary tubes A and B are both of the same electrical resistance, so that any change in the electrical current flowing through them will affect their respective temperatures by a like amount. This is particularly advantageous since any change in the voltage across the platinum capillary tubes will not affect the ratio of their respective resistances to the flow of gas. The tension of the gas in chamber 1 will therefore remain constant regardless of changes in voltage, because any change will affect the temperature of A and B alike. By means of the rheostat 8 the temperature of both the platinum capillary tubes A and B is adjusted to a point above which the combustible constituent of the gas passing through them will ignite. As previously stated, if we have a constant pressure in pipe 2, and a constant but lower pressure in pipe 3, then so long as tube A offers the same resistance to the flow of gas as tube B, the pressure of the gas in chamber 1 will be less than the initial pressure in pipe 2 by an amount equal to one-half of the difference between the pressure in pipe 2 and the pressure in pipe 3.

Let us now assume that air from pipe 2 under a constant pressure is forced into chamber 1 through the capillary tube A and out through the capillary tube B into pipe 3 where a constant but lower pressure is maintained, the pressure or tension of the gas in chamber 1 being measured by the manometer tube 10 and by the recording gauge 11. This tension depends upon the relative resistances of tubes A and B to the gas flow, which resistances under the conditions stated are equal. Now let us assume that the air entering chamber 1 through the hot capillary tube A contains a quantity of combustible gas. As soon as this gas comes in contact with the tube A, it will ignite, thereby increasing the temperature of that tube. This increase in temperature will increase the resistance to the flow of gas which is entering chamber 1 through tube A, thereby decreasing the pressure in chamber 1. The pressure within chamber 1 will continue to decrease until the amount of gas that is forced out through tube B against the constant pressure in pipe 3 is again equal to the amount of gas forced in against the increased resistance of the capillary tube A. The capillary tube A is of such a length that all of the combustible gas passing through it will be completely oxidized before it enters chamber 1 where it again cools down. The gas leaving chamber 1 has therefore no effect on the temperature of the outlet tube B while the temperature of the tube A is affected in proportion to the amount of combustible in the air passing through it. The tension of the gas in chamber 1 is thus affected in accordance with any change in said temperature. The tension of the gas in chamber 1 can therefore be calibrated in heat units per unit volume of gas, or direct in percentages of a known combustible or its equivalent. Said tension, as previously stated, is measured by the manometer tube 10 in which water or other indicating liquid rises from vessel 12 to a height depending upon the tension in chamber 1, and by the recording gauge 11 which is connected with chamber 1 by means of pipe 13.

It is obvious that if capillary tubes A and B are of the same electrical resistance, the temperature rise due to the flow of electric current will be the same in each case and the tension of the gas in chamber 1 will remain constant so long as gas entering through tube A and leaving through tube B contains no combustible mixture. This initial tension in the chamber 1 is represented by the water column in manometer tube 10, the height of which extends from the level of the water in jar 12 to the zero line of scale 14. In order to make it possible to adjust the pressure of the gas in chamber 1 to the zero line of scale 14 when there is no combustible in the gas passing through tubes A and B, there is provided a rheostat 15 through which part of the current passing through the restriction B can be shunted, thus making it possible to adjust to zero at any time by merely adjusting the relative temperatures of tubes A and B through an adjustment of the rheostat 15. This rheostat is connected with one side of the tube B through wire 16 and with the other side through wire 17.

The gas whose combustible constituent is to be measured enters the apparatus through a filter 18, where any suspended matter in the gas is removed. From filter 18 it passes through pipe 33, from pipe 33 through a drier 19 containing calcium chloride, and from which the absorbed moisture is permitted to flow through pipe 29 into seal 30. Any other kind of drier to accomplish the same result can of course be used instead of the one herein described. From the drier 19 the gas passes through the pipe 28; from pipe 28 through an orifice 20, from the orifice 20 to the pipe 2 already referred to. From pipe 2 the gas enters chamber 1 through the restriction A and leaves chamber 1 through the restriction B, whence it leaves the system through pipe 3, all as will be hereinafter more fully explained.

I provide a regulating device, consisting first of a vessel 22 containing water 23, and the propulsion of the gas through the system as above described is caused primarily by the suction from the steam or water aspirator 21, which is connected with the vessel 22 at a point above the level of the water contained therein. Vessel 22 with the water it contains and the pipes 24, 25 and 26, all of whose open ends are submerged in the water, constitute a regulator, the functioning of which will be hereinafter more fully described.

The purpose of the regulator is to keep the gas within the pipe 3 at a constant pressure, and the gas within the pipe 2 at a constant but higher pressure, all regardless of what the capacity of the aspirator 21 may be. The vessel 22 which contains water 23 is closed to the atmospheric pressure, except through the pipe 26 the lower end of which is submerged in the water to within a definite distance from the bottom of vessel 22, and the other end of which communicates with the atmosphere at 27. As the aspirator 21 reduces the pressure of the gas in the space above the liquid, the water in the pipe 26 will be forced down by the atmospheric pressure, until air finally bubbles from the submerged end of this tube. The pressure of the gas in the space above the liquid 23 in vessel 22 can, therefore, only be reduced to a point where air bubbles through the liquid from the bottom of pipe 26, in which case, as fast as air is removed from the space above the liquid by means of the aspirator, just so fast will a like amount of air from the bottom of pipe 26 replace that which has been removed by the aspirator. So long as air bubbles from the submerged end of the pipe 26 this tube will be free from water on the inside and the atmospheric pressure will extend down to the bottom of this tube where it comes into contact with the water within vessel 22. It therefore follows that the atmospheric pressure and the pressure of the water balance each other at the submerged end of tube 26. Thus all the water at level $a, a$, will be maintained at atmospheric pressure so long as some air bubbles from the bottom of pipe 26. It therefore also follows that the pressure of the water at the level $b, b$, will be less than the pressure at the level $a, a$, by an amount equivalent to the head of water represented by the perpendicular distance between the levels $a, a$, and $b, b$, and the pressure of the water at the level $c, c$, will be less than the pressure of the level $b, b$, by an amount equivalent to the head of water represented by the perpendicular distance between the levels $b, b$, and $c, c$.

Pipes 24 and 25 are submerged in the liquid so that the respective open ends are at the levels $c, c$, and $b, b$, of the liquid in the vessel 22, and the aspirator 21 is of sufficient capacity to cause bubbles to issue from the bottom of each of these tubes, including the atmospheric tube 26. The bubbles issuing from the bottom of tube 26 are of air which enters through the opening 27. The air which enters through pipe 26 satisfies the excess capacity of aspirator 21 and without disturbing the atmospheric pressure at the level $a, a$, at which level the atmosphere and the liquid in the vessel meet. The tension of the liquid at the level $b, b$, which is less than atmospheric pressure, permits gas to bubble from the end of tube 25, said gas coming from the source, through filter 18, drier 19, pipe 28, orifice 20, through pipe 2. The size of the orifice 20 is such that it will not permit sufficient gas to flow through it to satisfy the aspirator 21, the remaining capacity of the aspirator 21 being taken care of by the air bubbles from the submerged end of tube 26 as already stated. Air will therefore continue to bubble from the submerged end of pipe 26, thus maintaining the level $a, a$, at atmospheric pressure and the levels $b, b$, and $c, c$, at corresponding lower pressures. The gas in pipe 2 which communicates with the level $b, b$, through pipe 25, will thus be kept at a constant pressure corresponding to the pressure at the level $b, b$, regardless of what the original pressure of the gas in pipe 28 may be. Since the pressure at the level $c, c$, is less than the pressure at the level $b, b$, some of the gas in tube 2 will be forced through the capillary tubes A and B, then through pipe 3 and out through the submerged end of pipe 24 at the level $c, c$. The pressure of the gas emerging from the open end of pipe 24 is balanced by the pressure of the liquid at level $c, c$. The gas in pipe 3 is thus also automatically kept at the constant pressure corresponding to this level.

In following the path of the gas through the entire system, it must first be remembered that by means of the aspirator 21 and the regulator just described the pressure of the liquid at level $a, a$, is maintained constant and equal to the pressure of the atmosphere; thus the pressure at the level $b, b$, is maintained constant at pressure less than atmospheric and the pressure at the level $c, c$, is maintained constant at a pressure less than the pressure at the level $b, b$. The gas whose combustible constituent is to be measured, enters through filter 18, drier 19, and pipe 28 at the pressure of the gas existing at the source and which may vary within wide limits. As soon as the gas passes the orifice 20 its pressure is reduced to the constant pressure existing at the level $b, b$. The surplus gas which is forced through the orifice 20 by the pressure in pipe 28 bubbles from the submerged end of pipe 25, which end, as already stated, coincides with the level $b, b$, the pressure of this level being kept constant. Some of the gas in pipe 2 which is thus maintained at a pressure equal to the pressure at level $b, b$, is forced through the capillary tubes A and B to the lower pressure existing in pipe 3 and which is maintained at a constant pressure corresponding to the pressure at level $c, c$. As soon as gas is forced into pipe 3, through tubes A and B, a corresponding amount of gas will immediately bubble out from the open end of pipe 24 at the level $c, c$, thus always keeping the gas in pipe 3 at the constant pressure corresponding to that level.

It is apparent from the above that if the gas passing through the system is air or of any other non-combustible nature, the tension of the air in chamber 1 will be constant. This constant tension can be adjusted to the zero line of the scale 14 by the rheostat 15 which will establish the proper temperature relation between the capillary tubes A and B to establish the desired initial tension in chamber 1.

On the other hand if the air passing through the system contains a combustible gas, the combustible constituent will ignite and completely burn as it passes through the hot capillary tube A. Thus the heat developed by the burning of the combustible constituent of the air will increase the temperature of the capillary tube or restriction A to a point depending upon the heat value of the combustible constituent. This increase in temperature will increase the resistance of the flow of gas through A from pipe 2, where the gas is maintained at a constant pressure. A smaller amount of gas will thus enter the chamber 1. This will cause the pressure in chamber 1 to drop until the amount of gas forced out of chamber 1 through capillary tube B against the constant lower pressure in pipe 3 is again the same as the amount of gas entering the capillary tube A under the new condition.

It therefore follows that the pressure in chamber 1 will have a definite relation to the heat value of the combustible constituent in the air which enters the instrument. The manometer tube 10 and the recording gauge 11 which are connected to measure the tension of the gas in the chamber 1, can thereofore be calibrated in desired units such as per cent of combustible, heat units per cubic foot, or the equivalent of the heat value measured in any other desired unit.

Various changes in the details of construction of the various parts may be made without exceeding the scope of the invention as claimed. The size, shape and relation of the parts, the construction of the regulating vessel, the details of the various tubes which enter the same and the means for connecting them with the inlet and outlet, as well as the means for heating the inlet and outlet, may be varied within very wide limits without departing from the invention and I reserve the liberty of making all such changes as may be found to be advisable.

Having thus described my invention, what I claim as new and desire to secure by Letters Patent, is:

1. In a combustible recorder, the combination with a chamber having an inlet and an outlet, means for passing gas through the same, means for heating the inlet and outlet, and means for measuring the tension of the gas in the chamber.

2. In a combustible recorder, the combination with a chamber having an inlet and an outlet, means for forcing gas through the same, means for heating the inlet and outlet, means for measuring the tension of the gas in the chamber, and a regulating device for controlling the pressure of the gas.

3. In a combustible recorder, the combination of a chamber having an inlet and an outlet, means for forcing gas through the same, means for heating the inlet and outlet, means for measuring the tension of the gas, and a regulator for keeping the entering gas at a constant pressure and the outgoing gas at a constant but lower pressure.

4. In a combustible recorder, the combination with a chamber, means for carrying the gas thereto having an attenuated connection therewith, means for carrying the gas away from the chamber and having an attenuated connection with said chamber, and means for heating the attenuated connections.

5. In a combustible recorder, the combination with a chamber, means for carrying the gas thereto having an attenuated connection therewith, means for carrying the gas away from the chamber and having an attenuated connection with said chamber, and means for heating the attenuated connections, together with a regulator and a measuring means.

6. In a combustible recorder, the combination of a chamber, means for carrying the gas thereto having an attenuated connection therewith, means for carrying the gas away from the chamber and having an attenuated connection with said chamber, means for forcing gas into and out of the chamber and through the carrying means, means for keeping the gas at a constant pressure before it enters the chamber, means for keeping the gas at a constant but lower pressure after it leaves the chamber, and means for heating the attenuated connections.

7. In a combustible recorder, the combination of a chamber, means for carrying the gas thereto having an attenuated connection therewith, means for carrying the gas away from the chamber and having an attenuated connection with said chamber, means for forcing gas into and out of the chamber and through the carrying means, means for keeping the gas at a constant pressure before it enters the chamber, means for keeping the gas at a constant but lower pressure after it leaves the chamber, and means for heating the attenuated connections, and a regulator consisting essentially of a vessel containing liquid and closed to the atmosphere except at one point, together with a plurality of tubes entering the liquid to convey pressure to different levels therein, substantially as described.

8. In a combustible recorder, the combination with a chamber having an inlet and an outlet, each consisting of a tube, of means for forcing gas into and out of the chamber through the respective tubes, means for heating both of the tubes, and means for measuring the tension of the gas in the chamber between the tubes.

9. In a combustible recorder, the combination with a chamber having an inlet and an outlet, each consisting of a small tube, of means for forcing the gas into and out of the chamber through the respective tubes, means for electrically heating both of the tubes, and means for measuring the tension of the gas in the chamber between the tubes.

10. In a combustible recorder, the combination with a chamber having an inlet and an outlet, each consisting of a tube of small bore, of means for forcing gas into and out of the chamber through the respective tubes, means for keeping the gas just before it enters the inlet tube at a constant pressure, means for keeping the gas just after it leaves the outlet tube at a lower constant pressure, means for heating the tubes, and means for measuring the tension of the gas between the two tubes.

11. In a combustible recorder, the combination with a chamber having an inlet and an outlet, each consisting of a capillary tube, of means for forcing gas into and out of the chamber through the respective tubes, means for keeping the gas as it enters the inlet tube at a constant pressure, means for keeping the gas as it leaves the outlet tube at a constant but lower pressure, means for heating the tubes, means for cleaning and drying the gas before it passes through the tubes, and means for measuring the pressure of the gas in the chamber between the tubes.

12. In a combustible recorder, the combination of two tubes in series and through which a gas is forced, of means for heating both of the tubes, and means for measuring the tension of the gas between them.

13. In a combustible recorder, the combination with a chamber having an inlet and an outlet, each consisting of a tube, means for forcing the air into and out of the chamber through said tubes, means for heating the tubes, and a regulator for keeping the gas before it enters the inlet tube at a constant pressure, and keeping the gas after it leaves the outlet tube at a constant and lower pressure, said regulator including a liquid-containing vessel and a plurality of tubes therein which enter the liquid to convey pressure to different levels thereof, substantially in the manner and for the purpose set forth.

14. In a combustible recorder, the combination with a chamber having a restricted inlet and a restricted outlet, means for heating the inlet and outlet, means for measuring the tension of the gas in the chamber, a vessel partially filled with liquid, a submerged tube in said vessel which is open to the atmosphere, a second submerged tube in said vessel which extends to within a definite distance above the bottom of the first tube and connects with the inlet to the chamber, a third tube submerged in the liquid to within a definite distance above the submerged end of the second submerged tube, a connection between said third submerged tube and the outlet of the chamber, all substantially as described.

15. In a combustible recorder, the combination with a chamber having an inlet and an outlet each of small bore, means for forcing gas into and out of the chamber, means for heating the inlet and outlet, means for measuring the pressure in the chamber, and a regulating device connected with the inlet and outlet and consisting essentially of a liquid-carrying vessel, a submerged tube therein having one end open to the atmosphere, a second tube therein which communicates with the inlet, and a third submerged tube which connects with the outlet, all substantially as specified.

16. In a combustible recorder, the combination with a chamber having an inlet and an outlet each of small bore, means for forcing gas into and out of the chamber, means for heating the inlet and outlet, means for measuring the pressure in the chamber, and a regulating device connected with the inlet and outlet and consisting essentially of a liquid-carrying vessel, a submerged tube therein having one end open to the atmosphere, a second tube therein which communicates with the inlet, and a third submerged tube which connects with the outlet, all substantially as specified, together with an aspirating device for exhausting air from the interior of the vessel above the liquid.

17. In a combustible recorder, the combination with a vessel partially filled with liquid and closed to the atmosphere except through a tube one end of which is submerged in the liquid and the other end of which is open to the atmosphere, of means for exhausting the gas from the space above the liquid in the vessel, a second tube, one end of which is submerged in the liquid to within a definite distance above the bottom of the first tube, and the other end of which communicates with the source of gas whose combustible constituent is to be measured, a resistance to the flow of gas through the second tube, a chamber having a restricted inlet and a restricted outlet, a connection between the restricted inlet and the second submerged tube at a point between the submerged end of said tube and the resistance to the flow of gas through said tube, a third tube one end of which is submerged in the liquid to within a definite distance above the submerged end of the second submerged tube, a connection between the third submerged tube and the restricted outlet of the chamber, means for heating the restricted inlet and outlet of the chamber, and means for measuring the tension within the chamber.

In testimony whereof I hereunto affix my signature.

FRITZ FREDERICK UEHLING.